United States Patent [19]

Suizu

[11] 3,921,828

[45] Nov. 25, 1975

[54] APPARATUS FOR TRANSFERRING GOODS WITHIN A STORAGE SYSTEM

[75] Inventor: Dairi Suizu, Sowa, Japan

[73] Assignee: Okura Yusoki Kabushiki Kaisha, Kakogawa, Japan

[22] Filed: Apr. 20, 1972

[21] Appl. No.: 245,875

[30] Foreign Application Priority Data
June 29, 1971  Japan.................................. 46-47431

[52] U.S. Cl. 214/16.4 C; 214/16.1 DB; 214/16.4 A
[51] Int. Cl.² ............................................ B65G 1/06
[58] Field of Search .. 217/16.4 A, 16.4 C, 16.1 CC, 217/16.1 DB, 16.1 CF

[56] References Cited
UNITED STATES PATENTS

| | | | |
|---|---|---|---|
| 891,760 | 6/1908 | Bickley | 214/16.1 DB |
| 3,182,823 | 5/1965 | Chasar | 214/16.4 A |
| 3,219,205 | 11/1965 | Grant | 214/16.1 DB |
| 3,507,406 | 4/1970 | Zollinger | 214/16.4 A |
| 3,520,424 | 7/1970 | Lemelson | 214/16.4 A |
| 3,565,267 | 2/1971 | Jerome | 214/16.4 A |
| 3,610,445 | 10/1971 | Kitchen | 214/16.4 A |
| 3,674,159 | 7/1972 | Lemelson | 214/16.4 A |

FOREIGN PATENTS OR APPLICATIONS

| | | | |
|---|---|---|---|
| 786,661 | 6/1968 | Canada | 214/16.4 R |
| 74,773 | 1/1961 | France | 214/16.1 DB |

Primary Examiner—Frank E. Werner
Assistant Examiner—R. B. Johnson
Attorney, Agent, or Firm—Stevens, Davis, Miller & Mosher

[57] ABSTRACT

The invention relates to an apparatus for carrying in and carrying out goods and storing same having a goods supporting shelf assembly with a multiple layered-multiple rowed arrangement of goods supporting shelves, at least one stacker crane set on either the carry-in side or the carry-out side of the shelf assembly and which moves at substantially a right angle to the assembly's longitudinal axis and which has an elevator for carrying the goods in or out of the shelf assembly. The shelves of the assembly have means for pulling-out the goods toward the carry-out side of the assembly and containing locking members which do not operate when a forward direction force is applied but which will function when a backward direction force is used. The guides for the pull-out means are located below the surface of the locking members.

1 Claim, 7 Drawing Figures

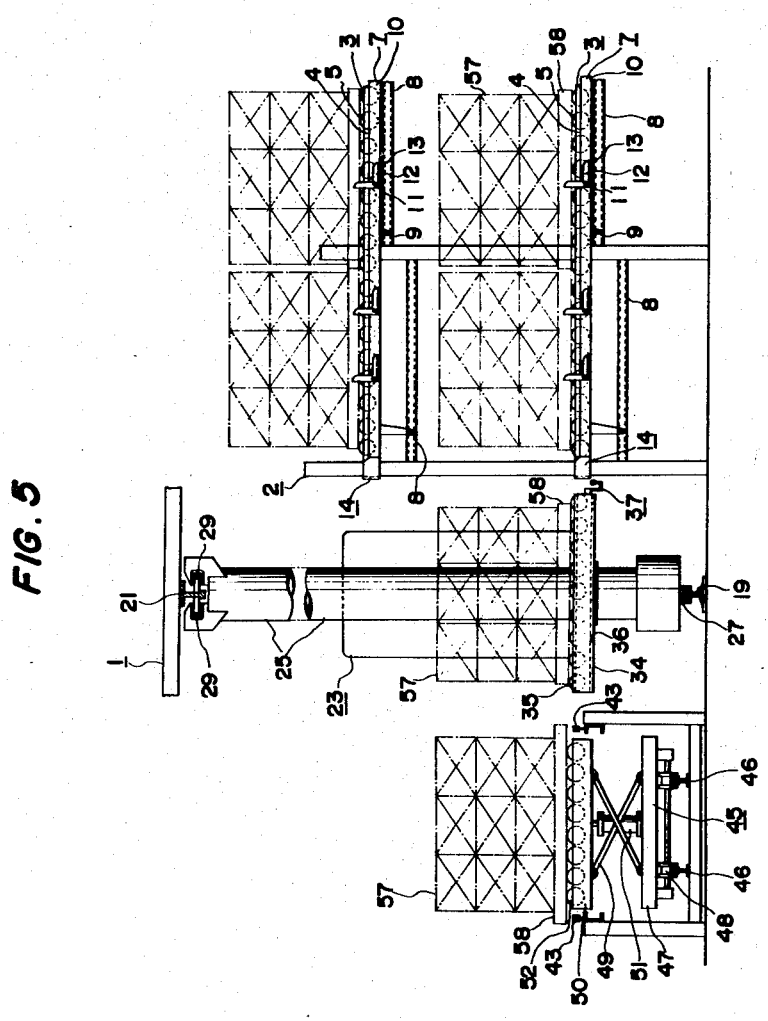

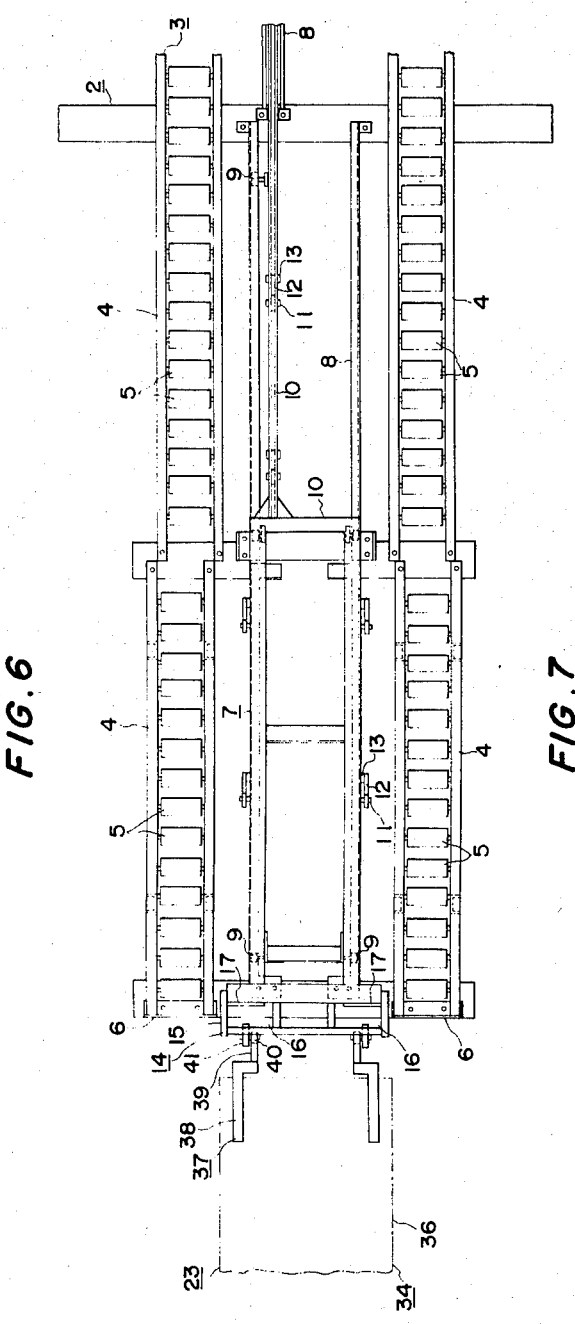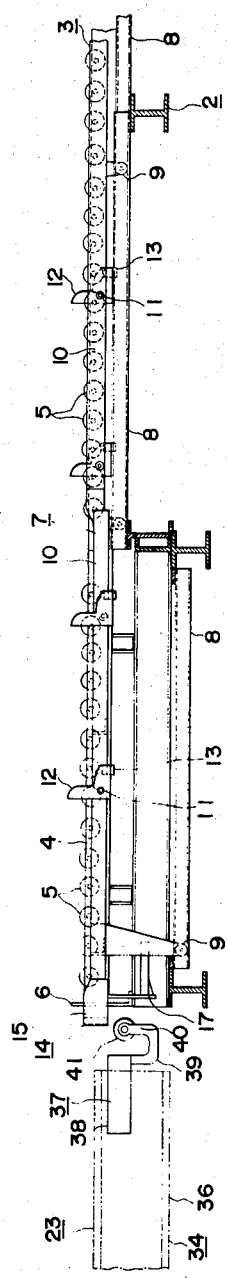

APPARATUS FOR TRANSFERRING GOODS WITHIN A STORAGE SYSTEM

This invention relates to an apparatus for carrying in and carrying out goods and storing the same.

Heretofore, it has been the sole object of a warehouse to store goods therein. In recent years, however, automation of the operation of a warehouse has tended to shift the attention of those concerned in the warehouse business from mere storing of goods to how efficiently to move the goods to be stored in the warehouse. Nowadays, the advances made in the progress of automation of the warehouse business have made it possible to automate not only the operation of storing goods but also the operation of moving them before carrying them in the warehouse and after carrying them out of the wardhouse through complicated channels, including the operation of processing the information on the goods stored.

Accordingly, an object of this invention is to provide an apparatus for carrying in and carrying out goods and storing the same which permits to perform smoothly and quickly the operations of bringing goods carrying pallets one shelf of a goods supporting shelf assembly comprising a plurality of shelves arranged in multiple layers and multiple rows for storing goods thereon, storing such goods on such shelf, and taking the pallets out of such shelf.

Another object of the invention is to provide an apparatus for carrying in and carrying out goods and storing the same which comprises a stacket crane movably disposed along either the goods carrying-in side or the goods carrying-out side of the goods supporting shelf assembly comprising a plurality of shelves for supporting goods thereon arranged in multiple layers and multiple rows, or preferably a plurality of stacker cranes each disposed on the goods carrying-in side and goods carrying-out sides respectively of such supporting shelf assembly, so that goods can be readily and positively carried in each shelf of the plurality of shelves of the supporting shelf assembly and carried out of it.

Another object of the invention is to provide an apparatus for carrying in and carrying out goods and storing the same which comprises pull-out means provided on each shelf of the supporting shelf assembly for pulling out the goods supported thereon and moving the same toward the carry-out side of the assembly, and which permits, when goods supported on each shelf have been taken out through the goods carry-out side of the shelf assembly, the next following goods to be positively moved toward the goods carry-out side while such goods are prevented from being dislodged from the shelf through the goods carry-out side of the shelf assembly.

Another object of the invention is to provide an apparatus for carrying in and carrying out goods and storing the same wherein the pull-out means of the shelf on which the goods to be carried out are supported is actuated by a receiver connected to the stacker crane disposed on the goods carry-out side when such crane is actuated, so that the goods can be pulled out and moved to the goods carry-out side and taken out of the supporting shelf assembly in one operation by merely operating the stacker crane.

Another object of the invention is to provide an apparatus for carrying in and carrying out goods and storing the same which comprises a goods carry-in conveyor and a goods carry-out conveyor disposed along the paths of movement of the goods carry-in stacker crane and the goods carry-out stacker crane respectively, and transfer means for the goods carry-in stacker crane and transfer means for the goods carry-out stacker crane disposed along the goods carry-in conveyor and the goods carry-out conveyor respectively, each of such stacker cranes and the corresponding transfer means being adapted to be moved in synchronism with each other so that goods can be carried in and out efficiently and quickly when the stacker crane repeatedly moves an elevator up and down while being in a predetermined position.

The apparatus for carrying in and carrying out goods and storing the same according to this invention permits goods to be carried in and out positively and quickly. The invention permits damage to the goods to be eliminated, because they are not piled in a stack of great height when stored in the warehouse and not handled manually when moved in and out of the warehouse.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIG. 5 is a side view of the goods carry-out station of the apparatus according to this invention;

FIG. 6 is a plan view of one of the goods supporting shelves of the apparatus according to this invention; and FIG. 7 is a side view of FIG. 5.

Figure 1:
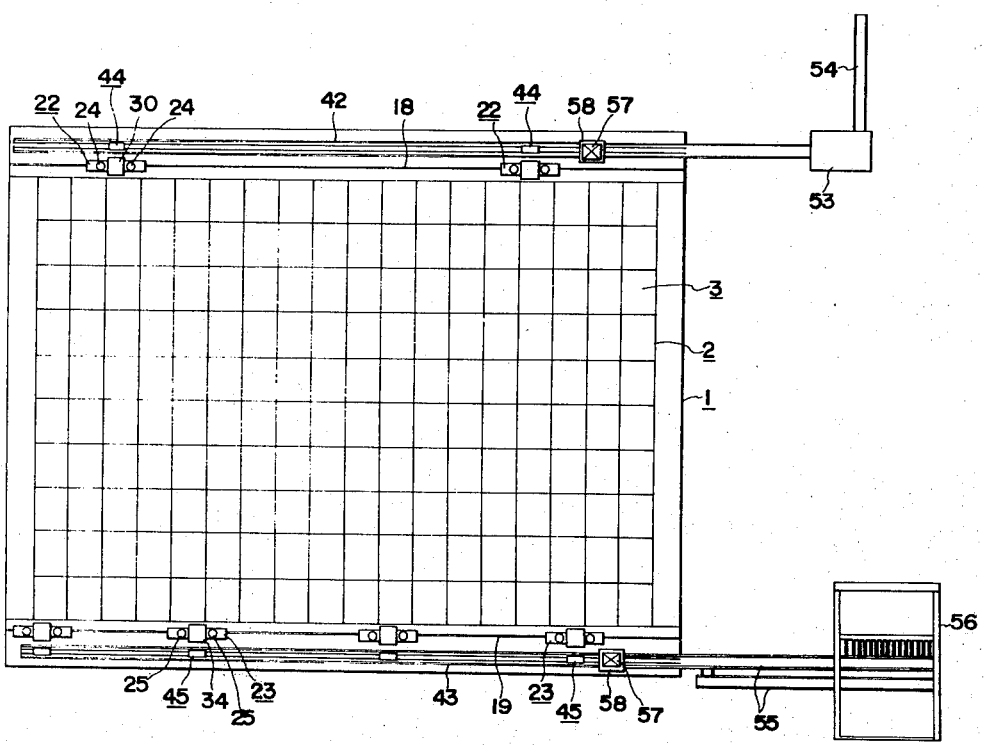
FIG. 1 is a plan view of the apparatus according to this invention showing it schematically.
Figure 2:
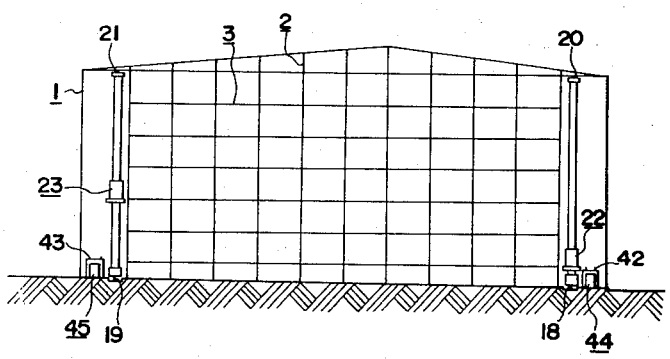
FIG. 2 is a side view of the apparatus of FIG. 1 showing it schematically.
Figure 3:
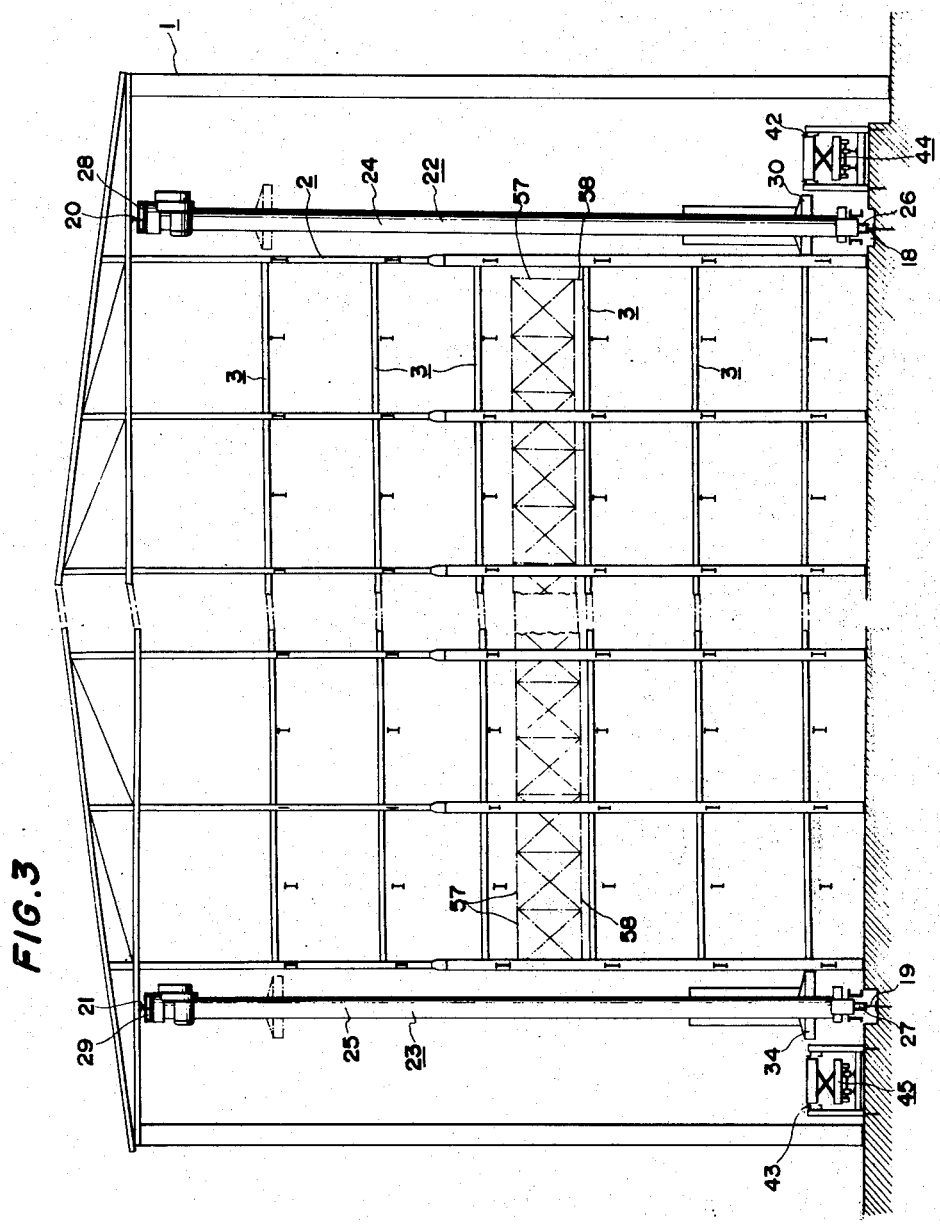
FIG. 3 is also a side view, on an enlarged scale, of the apparatus according to this invention.

A preferred embodiment of the invention will now be described with reference to the accompanying drawings. In FIG. 1, FIG. 2 and FIG. 3, a goods supporting shelf assembly 2 comprising a number of shelves 3 arranged in a plurality of layers and rows in disposed in a warehouse 1. Each shelf 3 comprises a frame 4 supporting thereon a number of rollers 5 arranged in side by side relations in two rows disposed at opposite side of frame 4 and parallel to each other along the longitudinal axis of shelf 3, as shown in FIGS. 6 and 7. A stopper 6 is attached to the goods carry-out side of each row of rollers 5.

Pull-out means 7 is provided on shelf 3 and disposed between the two rows of rollers 5. Pull-out means 7 comprises two guide rails 8 mounted on shelf 3 and disposed parallel to each other inwardly of the two rows of rollers 5 for movably supporting thereon a pull-out carriage 10 through a plurality of wheels 9.

A plurality of locking members 12 which are substantially in the shape of a letter L are attached to the pull-out carriage 10 in positions suitably spaced apart from each other for pivotal motion about a shaft 11 through which each locking member 12 is connected to carriage 10. The pull-out carriage 10 is provided with a retainer 13 connected thereto in a position corresponding to the lower side or front side of locking member 12, so that normally one leg of each L-shaped locking member 12 is maintained in an upright position aand its upper end extends above the rows of rollers 5 by the weight of the other leg thereof as shown in FIG. 7.

Attached to the goods carry-out side of pull-out carriage 10 is an engaging member 14 which comprises an engaging frame 15 connected to an upper portion of the goods carry-out side of pull-out carriage 10. Engaging frame 15 is formed with a plurality of engaging openings 16 disposed at opposite sides thereof, and a plurality of pressing plates 17 each disposed to face an inner side of one of the engaging openings 16.

As shown in FIG. 1 to FIG. 5, rails 18, 20, and 19, 21 are mounted at the goods carry-in side and goods carry-out side of warehouse 1 to be disposed on the base and upper beam of the warehouse along the longitudinal axis thereof. Upper and lower rails 20, 18 and 21, 19 support a plurality of stacker cranes 22 and 23 for movement therealong and longitudinally of the warehouse. The stacker crane 22 disposed at the goods carry-in side includes a post 24 having attached to its lower and upper ends wheels 26 and 28 which engage lower and upper rails 18 and 20 respectively, and the stacker crane 23 disposed on the goods carry-out side includes a post 25 having attached to its lower end upper ends wheels 27 and 29 which engage lower rail 19 and 21 respectively.

Stacker crane 22 has an elevator 30 mounted for elevatory motion on post 24. Elevator 30 is provided with a transfer conveyor 31, arranged thereon and disposed longitudinally of goods supporting shelf assembly 2, and a push-in member 32 adapted to move toward and away from the goods supporting shelf assembly 2 and including pallet engaging members 33 each pivotally connected to push-in member 32 through a shaft and normally urged by the biasing force of a spring (not shown) to project upwardly to have their upper ends disposed above transfer conveyor 31. Transfer conveyor 31 may comprise a plurality of transfer rollers or chains arranged in two rows at opposite sides of elevator 30. Stacker crane 23 has an elevator 34 mounted for elevatory motion on post 25. Elevator 34 is provided with a tranfer transfer 35 arranged longitudinally of goods supporting shelf assembly 2, and a fork-shaped receiver 36 comprising a plurality of members arranged in layers and adapted to move toward and away from goods storing shelf assembly 2 between a contracted position and an expanded position. Transfer conveyor 35 may comprise a plurality of transfer rollers or chains arranged in two rows at opposite sides of elevator 34.

As shown in FIG. 6 and FIG. 7, pull-out engaging members 37 are firmly secured to opposite sides of a front end of receiver 36. Pull-out engaging members 37, which are adapted to be brought into and out of engagement with the engaging member 14 of pull-out means 7 provided on each shelf 3, include hooks 39 secured to front end portions of bases 38 firmly secured to opposite sides of receiver 36. Hooks 39 support roller-shaped couplers 41 each mounted through a shaft on an upper end of an upwardly directed member 40 of each hook 39 and adapted to be brought into and out of engagement with the engaging member 14 of pull-out means 7. The vertical dimension of pull-out engaging members 37 is such that they are disposed between the upper and lower members of receiver 36.

A goods carry-in conveyor 42, which may comprise a plurality of chains or belts, is mounted outside the rail 18 for supporting goods carry-in stacker crane 22, and a goods carry-out conveyor 43, which may also comprise a plurality of chains or belts, is mounted outside the rail 19 for supporting goods carry-out stacker crane 23. Transfer means 44 is movably mounted along goods carry-in conveyor 42, and transfer means 45 is movably mounted along goods carry-out conveyor 43. Goods carry-in and carry-out conveyors 42, 43 are disposed at right angles to the longitudinal axis of goods supporting shelf assembly 2.

Figure 4:
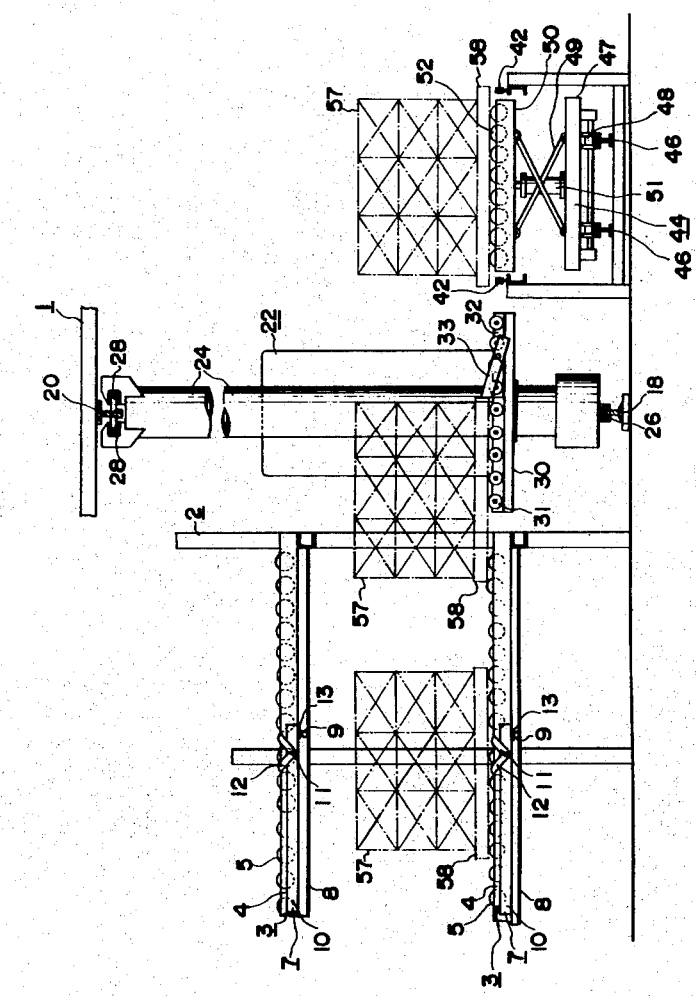
FIG. 4 is a side view of the goods carry-in station of the apparatus according to this invention.

As shown in FIG. 4, transfer means 44 comprises a plurality of rails 46, 46 disposed below goods carry-in conveyor 42 for supporting thereon a chassis 47 through wheels 48 connected to the latter. An electric motor (not shown) is mounted on chassis 47 and drivingly connected to wheels 48. An elevational frame 50 is mounted for elevatory motion above chassis 47 through a linkage 49 comprising two links pivotally connected to each other at their middle portions in the shape of a letter X. Hydraulic lifting means 51 mounted on chassis 47 is connected to elevational frame 50. A conveyor 52 comprising rollers or the like and arranged at right angles to rail 46 is mounted on elevational frame 50.

As shown in FIG. 5, transfer means 45 for goods carry-out conveyor 43 is identical in construction to transfer means 44 for goods carry-in conveyor 42, so that detailed description thereof is omitted.

As shown in FIG. 1, a conveyor 54 is connected to goods carry-in conveyor 42 through pallet loading means 53 while a conveyor 55 is connected at one end thereof to goods carry-out conveyor 43 and at the other end thereof to loading means 56.

In the drawings, 57 designates goods to be supported by shelf 3, and 58 designates a pallet.

In operation, goods 57 to be stored in warehouse 1 are transported by conveyor 54 and placed on pallet 58 in a plurality of layers and rows by pallet loading means 53. The pallet 58 carrying goods 57 thereon is then placed on goods carry-in conveyor 42 and transported thereby. The conveyor 52 of the transfer means 44 is waiting at a level lower than that of the goods carry-in conveyor 42. When the pallet 58 is transferred by the conveyor 52 above the transfer means 44, the conveyor 52 of the transfer means 44 is elevated so that the pallet 58 is lifted at a level, higher than that of the goods carry-in conveyor 42. Then the pallet 58 is transferred on the conveyor 31 of the elevator 30 at the goods carry-in stacker crane 22 by the movement of the conveyor 52. When the pallet 58 carrying goods 57 thereon reaches a predetermined position along goods supporting shelf assembly 2 in which it is juxtaposed to a predetermined shelf 3 for receiving goods 57, the lifting means 51 for transfer means 44 which has been moved to such predetermined position beforehand with stacker crane 22 cooperating therewith is actuated to move elevational frame 50 upwardly so as to place goods carrying pallet 58 on the conveyor 52 on elevational frame 50 and support the same at a level higher than that of carry-in conveyor 42. At the same time, conveyor 52 is actuated to move goods carrying pallet 58 in a direction at right angles to the direction of movement of carry-in conveyor 42 and transfer the same to the elevator 30 of goods carry-in stacker crane 22 which is standing stationary in a predetermined position after being moved thereto. Then, stacker crane 22 is actuated to move elevator 30 upwardly so as to move goods carrying stacker 58 upwardly to a predetermined vertical position. At this time, the pallet engaging members 33 of push-in member 32 of elevator 30 are pushed by pallets 58 to move downwardly in pivotal motion to their lower positions.

The conveyor 31 mounted on elevator 30 is actuated when goods carrying pallet 58 has reached the predetermined vertical position so as to move pallet 58 toward goods supporting shelf assembly 2. After pallet 58 has passed by pallet engaging members 33, pallet engaging members 33 are pivoted to their upper positions by the biasing force of the spring. Then, push-in member 32 moves toward goods supporting shelf assembly 2 and the pallet engaging members 33 of push-in member 32 engage the pallet 58 and push the same, so that goods carrying pallet 58 is transferred to the shelf 3 corresponding to the aforementioned predetermined vertical position. Since each shelf 3 is slightly inclined from the goods carry-in side toward the goods carry-out side, the goods 57 transferred to the shelf 3 gradually move along the rollers 5 thereon as next following goods are successively carried in the shelf 3. The L-shaped locking members 12 of carriage 10 of pull-out means 7 are each pivotally moved to a position shown in solid lines in FIG. 4, so as not to interfere with the movement of pallet 58. In this way, goods 57 are successively stored and supported on each shelf 3.

When the goods 57 supported by goods supporting shelf assembly 2 are carried out of the warehouse, the stacker crane 23 and transfer means 45 on the goods carry-out side are moved horizontally to positions in which they are juxtaposed to a particular shelf 3 on which the goods to be carried out are supported. The elevator 34 of stacker crane 23 are moved vertically to a position in which it is aligned with the shelf 3, and the fork-shaped receiver 35 of stacker crane 23 is moved horizontally to its extended position toward the goods carry-in side. At this time, the roller-shaped couplers 41 are attached to the front end of receiver 36 are brought into engagement with the pressing plate 17 of the engaging member 14 of carriage 10.

Pressing plates 17 are pushed and moved so as to move carriage 10 inwardly toward the goods carry-in side. After carriage 10 has moved a predetermined distance, receiver 36 is moved upwardly to support thereon the pallets 58, and then receiver 36 is further moved upwardly so that it may be disposed above stopper 6. This permits couplers 41 to be inserted in the engaging openings 16 of engaging frame 15.

After couplers 41 are received in engaging openings 16, receiver 36 is moved to its contracted position toward the goods carry-out side so as to move carriage 10 toward the goods carry-out side. At this time, the front ends of the L-shaped locking members 12 of carriage 10 are brought into engagement with the pallets 58 rested on the carriage 10, so that the pallets are moved toward the goods carry-out side as carriage 10 is moved as aforementioned till the frontmost pallet 58 is stopped by stopper 6.

After carriage 10 has been moved the receiver 36 is moved downwardly a predetermined distance to bring its couplers 41 out of engagement with engaging frame 15. Then, receiver 36 is moved outwardly to shift the pallets 58 with goods 57 rested thereon from the shelf 3 to stacker crane 23. At this time, the conveyor 35 on stacker crane 23 is actuated accurately to position the pallet 58 on the receiver 36.

Then, the elevator 34 is moved downwardly or upwardly to a position in which it is flush with the carry-out conveyor 43, and receiver 36 is moved horizontally toward carry-out conveyor 43 to shift the pallets 58 from receiver 36 to the conveyor 52 of transfer means 45. The elevational frame 50 on which conveyor 52 is supported is moved downwardly to place the pallets 58 on carry-out conveyor 43 and transport the same by carry-out conveyor 43 and conveyor 55 to a goods take-out station where the goods are transferred to a truck or other transportation means by loading means 56.

From the foregoing description, it will be appreciated that the apparatus according to this invention comprises many features which permit to perform smoothly and quickly by mechanical means the operations of carrying in goods and storing them on a shelf of the goods supporting shelf assembly comprising a plurality of goods supporting shelves arranged in multiple layers and rows and carrying out the goods supported by such goods supporting shelf assembly. The invention is conducive to increased efficiency in performing operations connected with warehouse business.

What is claimed is:

1. An apparatus for carrying in and carrying out stored goods and storing the same comprising
    a goods supporting shelf assembly (2) comprising a plurality of goods supporting shelves (3) arranged in multiple layers and multiple rows;
    pull-out means (10) mounted in each of said shelves (3) of the goods supporting shelf assembly (2) for pulling out toward the goods carry-out side the goods supported on the goods supporting shelves (3), said pull-out means (10) having a plurality of locking members (12) provided on said pull-out means (10) in positions suitably spaced apart from each other, said locking members (12) being maintained in an inoperative position when a force in the forward direction is applied thereto and in an operative position when a force in the backward direction is applied thereto, and an engaging member (14) mounted on the goods carry-out side of the pull-out means (10) having an engaging frame (15) formed with an opening (16) and pressing plates (17) disposed to face an inner side of the engaging opening (16), guide means for said pull-out means (10) located below the surface of said locking members (12); and
    stacker cranes (22, 23) disposed on both the goods carry-in side and goods carry-out side of said goods supporting shelf assembly (2) for movement along a path substantially at right angles to the longitudinal axis of the goods supporting shelf assembly (2), said stacker crane (22) disposed on the goods carry-in side having an elevator (30) for carrying goods in the shelves of the goods supporting shelf assembly (2), and a push-in member (32) adapted to move toward and away from the goods supporting shelf assembly (2), and said stacker crane (23) disposed on the goods carry-out side having an elevator (34) for carrying goods out of the shelves of the goods supporting shelf assembly (2), a receiver (36) provided on said elevator (34) for receiving goods thereon, and a pull-out engaging member (37) provided on an end of said receiver (36) at the goods carry-out side of the goods supporting shelf assembly (2) and having a hook (39) adapted to be brought into and out of engagement with said opening (16) of the engaging frame (15) and to be contacted with said pressing plates (17) so as to push it, whereby the goods on one of the shelves of the goods supporting shelf assembly (2) can be moved from the goods carry-in side to the goods carry-out side by the reciprocating motion of the pull-out engaging member (37) engaged with the engaging member (14) of said pull-out means (10).

* * * * *